United States Patent
Sudo et al.

(10) Patent No.: US 9,143,679 B2
(45) Date of Patent: Sep. 22, 2015

(54) ELECTRONIC APPARATUS, ELECTRONIC APPARATUS CONTROL METHOD, AND STORAGE MEDIUM

(71) Applicant: CANON KABUSHIKI KAISHA, Tokyo (JP)

(72) Inventors: Koji Sudo, Machida (JP); Takashi Yoshimi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 238 days.

(21) Appl. No.: 13/744,790

(22) Filed: Jan. 18, 2013

(65) Prior Publication Data

US 2013/0194447 A1    Aug. 1, 2013

(30) Foreign Application Priority Data

Jan. 26, 2012  (JP) ................... 2012-014578
Jan. 26, 2012  (JP) ................... 2012-014579
Jan. 31, 2012  (JP) ................... 2012-018822

(51) Int. Cl.
*H04N 5/232*   (2006.01)

(52) U.S. Cl.
CPC ....... *H04N 5/23229* (2013.01); *H04N 5/23293* (2013.01)

(58) Field of Classification Search
CPC . H04N 5/23293; H04N 5/77; H04N 5/23219; H04N 5/23248; H04N 9/8715; H04N 5/23245; G03B 17/02; G03B 17/20
USPC ......................... 348/333.99, 222.1
See application file for complete search history.

(56) References Cited

U.S. PATENT DOCUMENTS

| | | | |
|---|---|---|---|
| 2007/0065137 A1* | 3/2007 | Hara et al. ..................... | 396/291 |
| 2007/0115383 A1 | 5/2007 | Tsukatani | |
| 2007/0200945 A1* | 8/2007 | Inukai ....................... | 348/333.02 |
| 2009/0073285 A1* | 3/2009 | Terashima ............... | 348/231.99 |
| 2010/0123815 A1* | 5/2010 | Yim et al. ................. | 348/333.02 |
| 2011/0273589 A1* | 11/2011 | Mochimizo .............. | 348/231.99 |
| 2012/0069210 A1* | 3/2012 | Miyata ....................... | 348/222.1 |

FOREIGN PATENT DOCUMENTS

| | | |
|---|---|---|
| CN | 1936685 A | 3/2007 |
| CN | 101026693 A | 8/2007 |
| CN | 101453569 A | 6/2009 |
| EP | 1365569 A2 | 11/2003 |
| JP | 2005-253054 A | 9/2005 |

(Continued)

OTHER PUBLICATIONS

Russian Search report issued in corresponding application No. 2013103489 on Aug. 4, 2014.

(Continued)

*Primary Examiner* — Roberto Velez
*Assistant Examiner* — Tuan Le
(74) *Attorney, Agent, or Firm* — Carter, DeLuca, Farrell & Schmidt, LLP

(57) ABSTRACT

An electronic apparatus including an image sensing unit performs scene determination processing of determining a photographic scene based on an image being captured by the image sensing unit. Upon receiving a help designation to display a help screen, the electronic apparatus displays a description concerning the determined photographic scene as the help screen.

17 Claims, 13 Drawing Sheets

(56) References Cited

FOREIGN PATENT DOCUMENTS

| | | |
|---|---|---|
| JP | 2007-121654 A | 5/2007 |
| JP | 2007-142884 A | 6/2007 |

OTHER PUBLICATIONS

Chinese Office Action issued in corresponding application No. 201310024390.1 on Jul. 13, 2015.

* cited by examiner

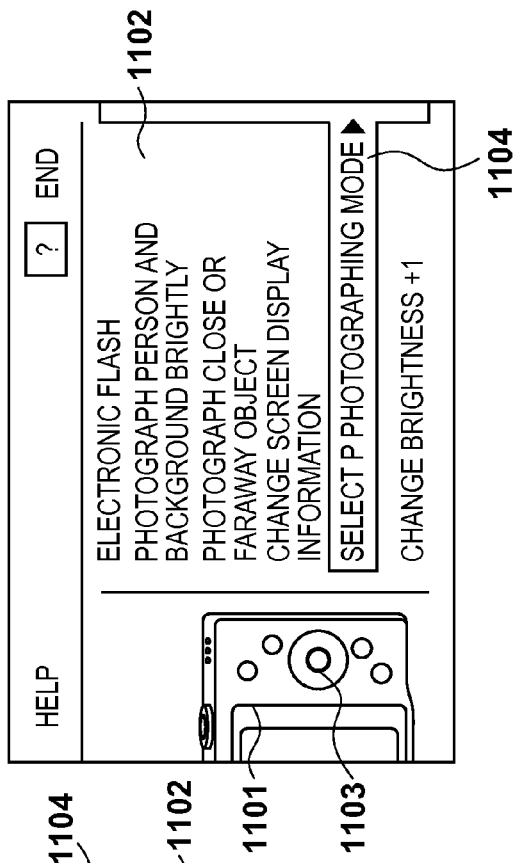
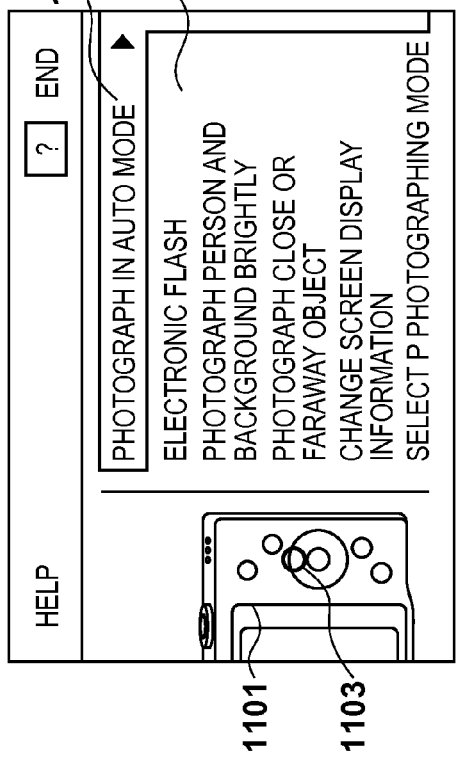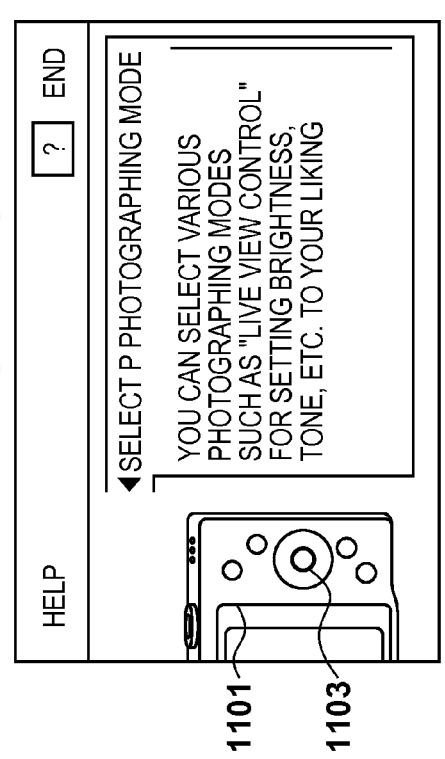

FIG. 13

| SCENE | DESCRIPTION | ADVICE |
|---|---|---|
| NORMAL | ADJUSTMENT IS DONE FOR OPTIMUM PHOTOGRAPHING<br><br>(DISPLAY EXAMPLE IS SHOWN IN FIG. 12D) | (ABSENT) |
| PERSON | BRIGHTNESS AND TONE ARE ADJUSTED TO OPTIMALLY PHOTOGRAPH BOTH BACKGROUND AND PERSON<br><br>(DISPLAY EXAMPLE IS SHOWN IN FIG. 12E) | IMPRESSION OF IMAGE CHANGES WHEN HEIGHT AND DIRECTION OF CAMERA ARE CHANGED<br><br>(DISPLAY EXAMPLE IS SHOWN IN FIG. 12G) |
| MACRO | BRIGHTNESS AND FOCUS ARE ADJUSTED TO OPTIMALLY PHOTOGRAPH BOTH BACKGROUND AND CLOSE OBJECT<br><br>(DISPLAY EXAMPLE IS SHOWN IN FIG. 12F) | WHEN PHOTOGRAPHING CLOSE OBJECT, FIRMLY HOLD CAMERA BECAUSE IMAGE READILY BLURS<br><br>(DISPLAY EXAMPLE IS SHOWN IN FIG. 12H) |

ELECTRONIC APPARATUS, ELECTRONIC APPARATUS CONTROL METHOD, AND STORAGE MEDIUM

BACKGROUND OF THE INVENTION

1. Field of the Invention

The present invention relates to an electronic apparatus including an image capture unit, an electronic apparatus control method, and a storage medium.

2. Description of the Related Art

In recent years, a function of automatically determining a photographic scene upon photographing has evolved in a digital camera. A digital camera having such a function automatically sets the photographing conditions of the camera in accordance with the determined photographic scene so that photographing can appropriately be performed without causing the user to set the photographing conditions. There is also an image capture apparatus that displays a help based on its operating state such that the user can know how to use the image capture apparatus without any instruction manual.

Japanese Patent Laid-Open No. 2005-253054 (patent literature 1) describes displaying an image representing an operation member of an image capture apparatus when it has transited to a help mode and describing the function of the operation member. Japanese Patent Laid-Open No. 2007-142884 (patent literature 2) describes changing the particulars of help display concerning an operation member based on whether the photographing mode will be used by a user experienced in the operation of the image capture apparatus. Japanese Patent Laid-Open No. 2007-121654 (patent literature 3) describes determining a photographic scene based on the features of an image under photographing and controlling the exposure, the shutter speed, the flash light emission amount, and the like in accordance with the determined scene.

However, patent literatures 1 and 2 do not consider changing the help screen in accordance with the scene determination result at all, although they describe doing help display concerning an operation member based on the photographing mode. Patent literature 3 does not consider cooperation between the scene determination result and the help screen at all, although it describes reflecting the scene determination result on the photographing settings.

An item about which the user requires a description of help display is supposed to change between an operation mode in which a lot of photographing settings are automatically done using a result obtained by determining a photographic scene, as in patent literature 3, and an operation mode in which many photographing settings are manually done by the user, as in manual photographing. For example, in the operation mode in which many photographing settings are manually done by the user, as in manual photographing, it is helpful to display, as a help, a description of operation members to be used for the photographing settings. On the other hand, in the operation mode in which a lot of photographing settings are automatically done using a result obtained by determining a photographic scene, displaying a description of operation members to be used for the photographing settings is of little help to the user. Although patent literature 2 describes changing the particulars of a help displayed for a certain operation depending on the photographing mode, changing the article of which a description is to be displayed is not taken into consideration.

SUMMARY OF THE INVENTION

One embodiment of the present invention provides an electronic apparatus capable of appropriately displaying a help in accordance with a scene determination result, an electronic apparatus control method, and a storage medium.

According to one embodiment of the present invention there is provided an electronic apparatus comprising: a determination unit configured to determine a photographic scene based on an image being captured by an image capture unit; a reception unit configured to receive a help designation to display a help screen; and a display control unit configured to control to display, in accordance with reception of the help designation by the reception unit, a description concerning the photographic scene determined by the determination unit as the help screen.

Also, according to another embodiment of the present invention there is provided an electronic apparatus control method comprising: a determination step of determining a photographic scene based on an image being captured by image capture unit; a reception step of receiving a help designation to display a help screen; and display control step of controlling to display, in accordance with reception of the help designation in the reception step, a description concerning the photographic scene determined in the determination step as the help screen.

Further features of the present invention will become apparent from the following description of exemplary embodiments with reference to the attached drawings.

BRIEF DESCRIPTION OF THE DRAWINGS

FIGS. 11A to 11C are views showing examples of screens in scene help display of the digital camera;

FIG. 13 is a view showing an example of help display when executing scene determination.

DESCRIPTION OF THE EMBODIMENTS

Preferred embodiments of the present invention will now be described with reference to the accompanying drawings. The following embodiments will be explained by exemplifying a case in which an apparatus and method according to the present invention are applied to an image capture apparatus that is a digital camera capable of capturing a still image and a moving image.

First Embodiment

Arrangement of Digital Camera

Figure 1:
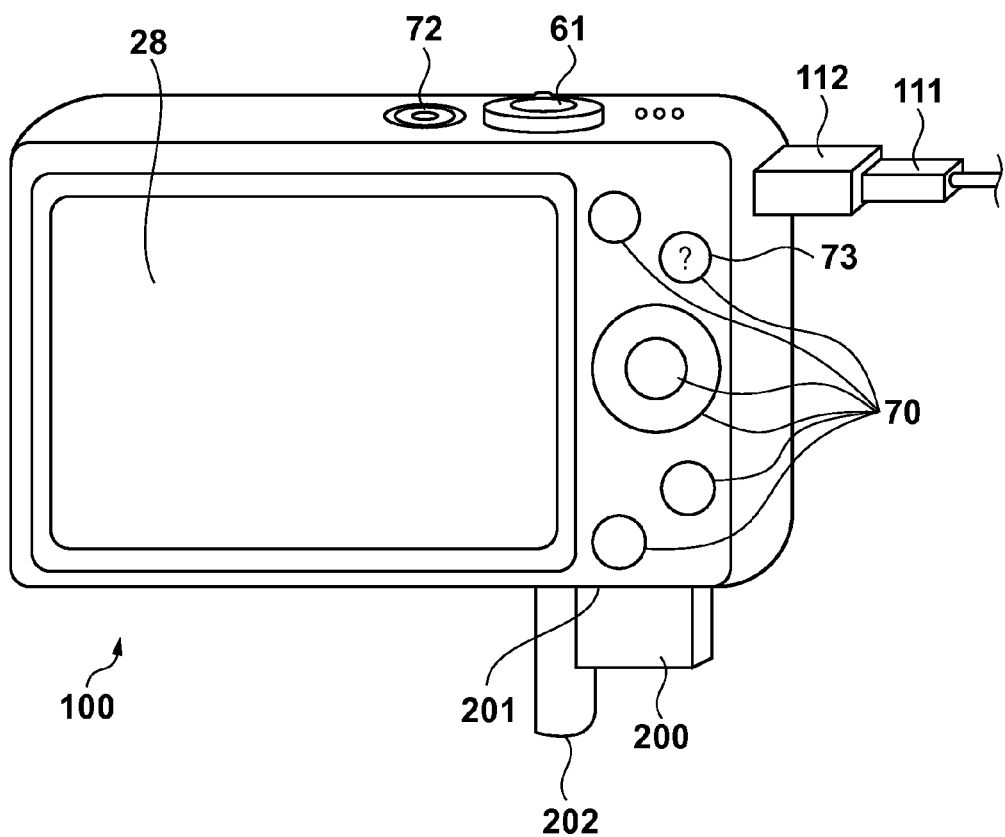
FIG. 1 is a perspective view showing the outer appearance of a digital camera as an example of an image capture apparatus according to an embodiment.

FIG. 1 is a perspective view showing the outer appearance of a digital camera 100 as an example of an image capture apparatus according to the embodiment. A display unit 28 includes a liquid crystal panel or the like and displays images and various kinds of information. A shutter button 61 is an operation unit used by the user to input a photographing designation. A connector 112 connects a connection cable to the digital camera 100. An operation unit 70 includes operation members such as various switches, buttons, and a touch panel for receiving various operations from the user.

A help button 73 is an operation button used to call a help mode. The user inputs a help designation by operating the help button 73. In this embodiment, when the user presses the help button 73 in a state in which photographic scene determination (to be referred to as scene determination hereinafter) is not performed, the display unit 28 displays a description of the functions and arrangements of operation units corresponding to the operating state at that time. On the other hand, when the user presses the help button 73 in a state in which scene determination is performed, the display unit 28 displays a description about the scene under photographing. Note that a character "?" is printed or inscribed on the help button 73 in advance such that the user can recognize that help information can be displayed by pressing the help button 73 independently of the display state of the display unit 28. Note that although the help button 73 has been exemplified as an operation means for inputting a help designation, the present invention is not limited to this. For example, another operation member may be used in combination, or the touch panel provided on the display unit 28 may be used. A power switch 72 powers on/off the digital camera 100. A recording medium 200 is a memory card, a hard disk, or the like. A recording medium slot 201 is used to store the recording medium 200. The recording medium 200 stored in the recording medium slot 201 can communicate with the digital camera 100. A lid 202 is the lid of the recording medium slot 201.

Figure 2:
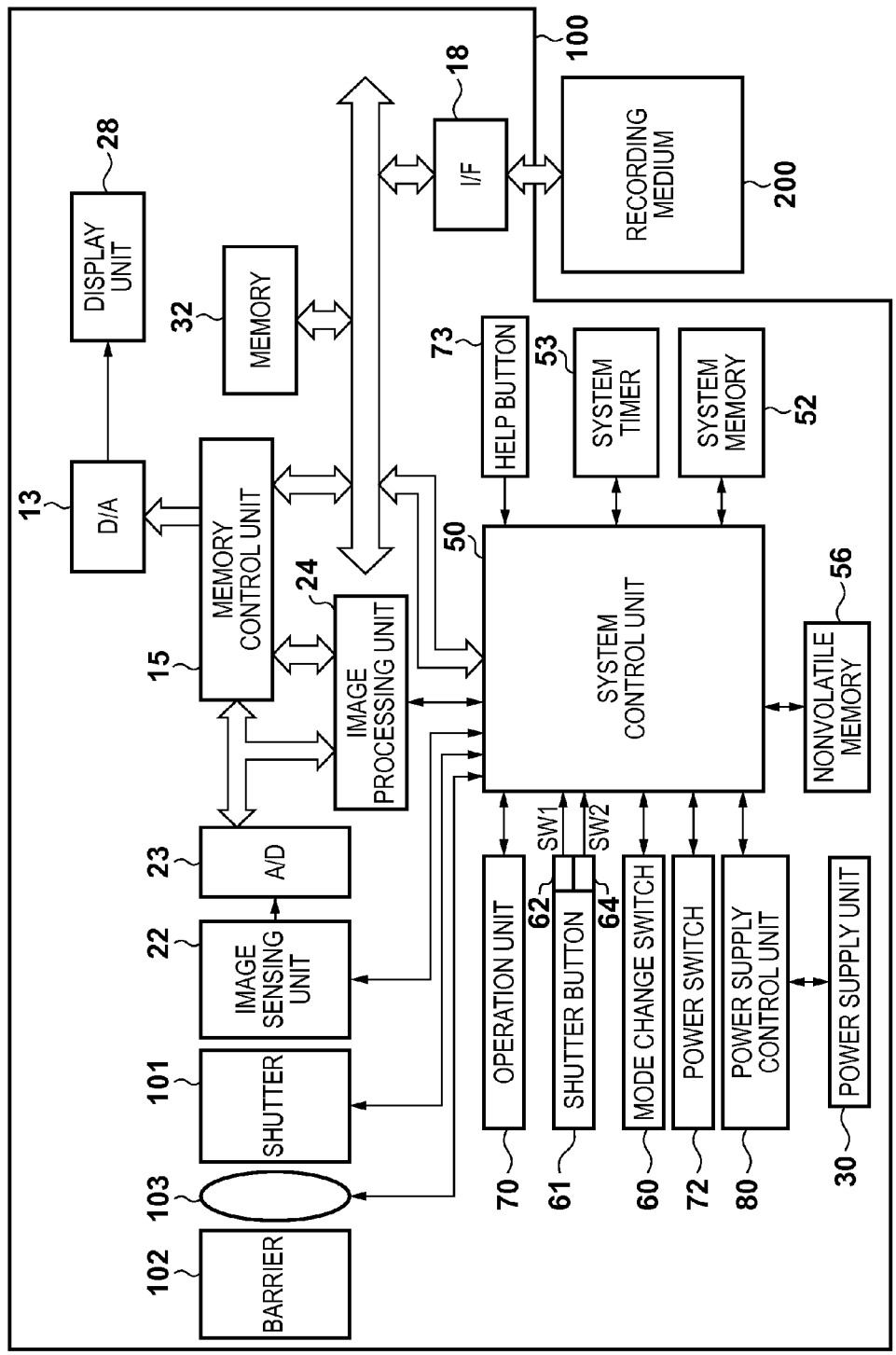
FIG. 2 is a block diagram showing the arrangement of the digital camera according to the embodiment.

FIG. 2 is a block diagram showing an example of the arrangement of the digital camera 100 according to this embodiment. Referring to FIG. 2, a photographing lens 103 is a lens group including a zoom lens and a focus lens. A shutter 101 has a stop function. An image sensing unit 22 includes an image sensor formed from a CCD or CMOS sensor that converts an optical image into an electrical signal. An A/D converter 23 converts the analog signal output from the image sensing unit 22 into a digital signal. A barrier 102 covers the photographing lens 103 of the digital camera 100, thereby preventing the image capture system including the photographing lens 103, the shutter 101, and the image sensing unit 22 from becoming dirty or damaged.

An image processing unit 24 performs resize processing such as predetermined pixel interpolation or reduction and color conversion processing for data from the A/D converter 23 or data from a memory control unit 15. The image processing unit 24 also performs predetermined arithmetic processing using captured image data. A system control unit 50 performs exposure control and focus control based on the obtained arithmetic result. AF (Auto Focus) processing, AE (Auto Exposure) processing, and EF (Electronic Flash preemission) processing of the TTL (Through The Lens) system are thus performed. The image processing unit 24 also performs predetermined arithmetic processing using captured image data, and AWB (Auto White Balance) processing of the TTL system is also performed based on the obtained arithmetic result.

The output data from the A/D converter 23 is directly written in a memory 32 via the image processing unit 24 and the memory control unit 15 or via the memory control unit 15 alone. The memory 32 stores image data obtained by the image sensing unit 22 and converted into digital data by the A/D converter 23 or image data to be displayed on the display unit 28. The memory 32 has a storage capacity enough to store a predetermined number of still images or a moving image and voices of a predetermined time.

The memory 32 also serves as a memory (video memory) for image display. A D/A converter 13 converts data for image display, which is stored in the memory 32, into an analog signal and supplies it to the display unit 28. The display image data written in the memory 32 is thus displayed by the display unit 28 via the D/A converter 13. The display unit 28 performs display according to the analog signal from the D/A converter 13 on a display device such as an LCD. When a digital signal temporarily converted by the A/D converter 23 and accumulated in the memory 32 is converted into an analog signal by the D/A converter 13, and the analog signal is sequentially transferred to the display unit 28 and displayed, through image display can be performed so that the display unit 28 can function as an electronic viewfinder.

A nonvolatile memory 56 is an electrically erasable/recordable memory. For example, an EEPROM or the like is used. The nonvolatile memory 56 stores constants and programs for the operation of the system control unit 50. The programs here mean programs to be used to execute various flowcharts to be described later in this embodiment.

The system control unit 50 controls the entire digital camera 100. The system control unit 50 executes the programs recorded in the above-described nonvolatile memory 56, thereby implementing each process according to this embodiment to be described later. A RAM is used as a system memory 52. The constants and variables for the operation of the system control unit 50, the programs read out from the nonvolatile memory 56, and the like are expanded on the system memory 52. The system control unit 50 controls the memory 32, the D/A converter 13, the display unit 28, and the like, thereby performing display control as well. A system timer 53 is a timer unit that measures a time used in various kinds of control or the time of an internal timepiece.

A first shutter switch 62 and a second shutter switch 64 included in the shutter button 61 and the operation unit 70 provide an operation environment for inputting various operation designations to the system control unit 50. A mode change switch 60 included in the operation unit 70 changes the operation mode of the system control unit 50 to one of a still image photographing mode, a moving image photographing mode, a reproduction mode, and the like. The still image photographing mode includes, for example, an auto mode, an auto scene mode, a manual mode, various scene modes for doing photographing settings specific on a photographic scene basis, a program AE mode, and a custom mode. The mode change switch 60 can change the operation mode to one of these modes included in the still image photographing mode. Alternatively, after the operation mode has temporarily been changed to the still image photographing mode by the mode change switch 60, the mode may be changed to one of the modes included in the still image photographing mode using another operation member. Similarly, the moving image photographing mode can also include a plurality of modes.

The first shutter switch 62 is turned on by operating the shutter button 61 provided on the digital camera 100 halfway, that is, so-called half stroke (image capture preparation designation) and generates a first shutter switch signal SW1. Operations such as AF (Auto Focus) processing, AE (Auto Exposure) processing, AWB (Auto White Balance) processing, and EF (Electronic Flash pre-emission) processing start based on the first shutter switch signal SW1. The second shutter switch 64 is turned on by completing the operation of the shutter button 61, that is, so-called full stroke (image capture designation) and generates a second shutter switch signal SW2. Based on the second shutter switch signal SW2, the system control unit 50 starts a series of image capture processing operations from signal read from the image sensing unit 22 to image data write in the recording medium 200.

The respective operation members of the operation unit 70 are appropriately allocated functions for each scene by, for example, selectively operating various function icons displayed on the display unit 28, and act as various function buttons. Examples of the function buttons are an end button, a return button, an image feed button, a jump button, a narrow-down button, and an attribute change button. For example, when a menu button is pressed, a menu screen capable of doing various settings is displayed on the display unit 28. The user can intuitively do various settings using the menu screen displayed on the display unit 28, a 4-way selector, and a set button. The operation unit 70 also includes the above-described help button 73.

A power supply control unit 80 is formed from a battery detection circuit, a DC/DC converter, a switch circuit for switching a block to be energized, and the like, and detects the presence/absence of battery attachment, the type of battery, and the battery level. The power supply control unit 80 also controls the DC/DC converter based on the detection result and a designation from the system control unit 50, and supplies a necessary voltage to the units including the recording medium 200 for a necessary period.

A power supply unit 30 is formed from a primary battery such as an alkali battery or a lithium battery; a secondary battery such as an NiCd battery, an NiMH battery, or an Li battery; an AC adapter, or the like. A recording medium I/F 18 is an interface to the recording medium 200 such as a memory card or a hard disk. The recording medium 200 is a recording medium such as a memory card for recording captured images, and is formed from a semiconductor memory, a magnetic disk, or the like.

[Overall Operation of Digital Camera]

Figure 3:
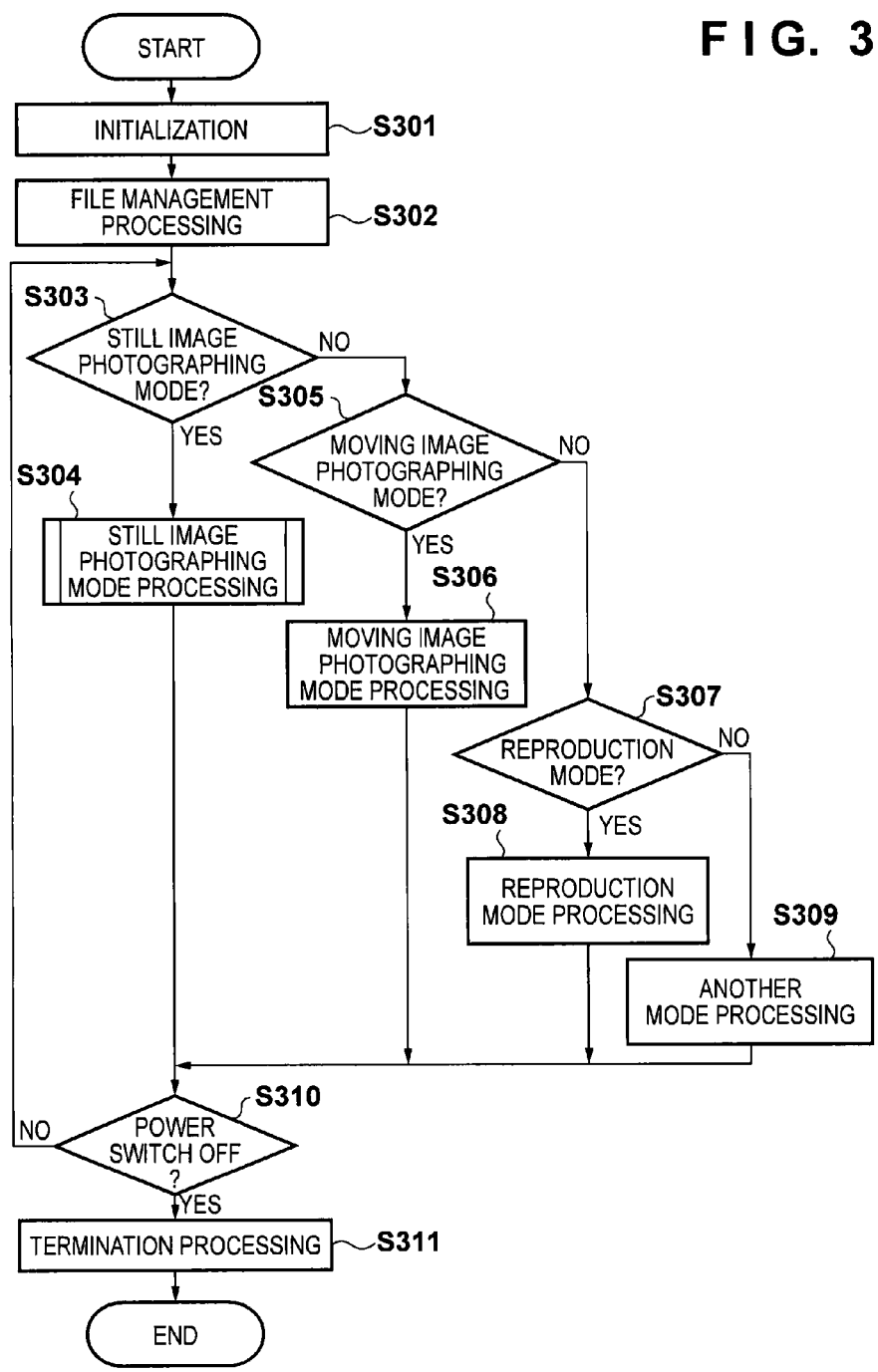
FIG. 3 is a flowchart of the overall operation of the digital camera.

FIG. 3 is a flowchart for explaining the overall operation of the digital camera 100 according to this embodiment. Each process of this flowchart is implemented by causing the system control unit 50 to expand a program stored in the memory 56 or the like on the system memory 52 and execute the program.

When the power switch 72 is operated to turn on the power supply, the system control unit 50 initializes flags, controlled variables, and the like in step S301. In step S302, the system control unit 50 starts management processing for files recorded in the recording medium 200.

In steps S303, S305, and S307, the system control unit 50 determines the current operation mode set by the mode change switch 60. If the current operation mode is the still image photographing mode, the process advances from step S303 to step S304, and the system control unit 50 executes still image photographing mode processing. Details of the still image photographing mode processing in step S304 will be described later with reference to FIG. 4. If the current operation mode is the moving image photographing mode, the process advances to step S306 via steps S303 and S305, and the system control unit 50 executes moving image photographing mode processing. If the current operation mode is the reproduction mode, the process advances to step S308 via steps S303, S305, and S307, and the system control unit 50 executes reproduction mode processing.

If another mode is set, the process advances to step S309, and the system control unit 50 executes processing corresponding to the selected mode. The other mode includes, for example, a transmission mode processing to transmit a file stored in the recording medium 200, and a reception mode processing to receive a file from an external apparatus and store it in the recording medium 200. After executing processing corresponding to the mode set by the mode change switch 60 out of the modes in steps S304, S306 S308, and S309, the process advances to step S310. In step S310, the system control unit 50 determines the setting of the power switch 72. If the power switch 72 is set on, the process returns to step S303. If the power switch 72 is set off, the process advances for step S310 to step S311, and the system control unit 50 performs termination processing. The termination processing includes, for example, changing the display of the display unit 28 to a termination state and closing the barrier 102 to protect the image sensing unit 22, and recording parameters, set values, and set modes including flags and controlled variables in the nonvolatile memory 56, and cutting off the power to portions that do not need power supply. Then the termination processing in step S311 is completed, the processing ends, and the power supply is shifted to the off state.

[Still Image Photographing Mode Processing]

Figure 4:
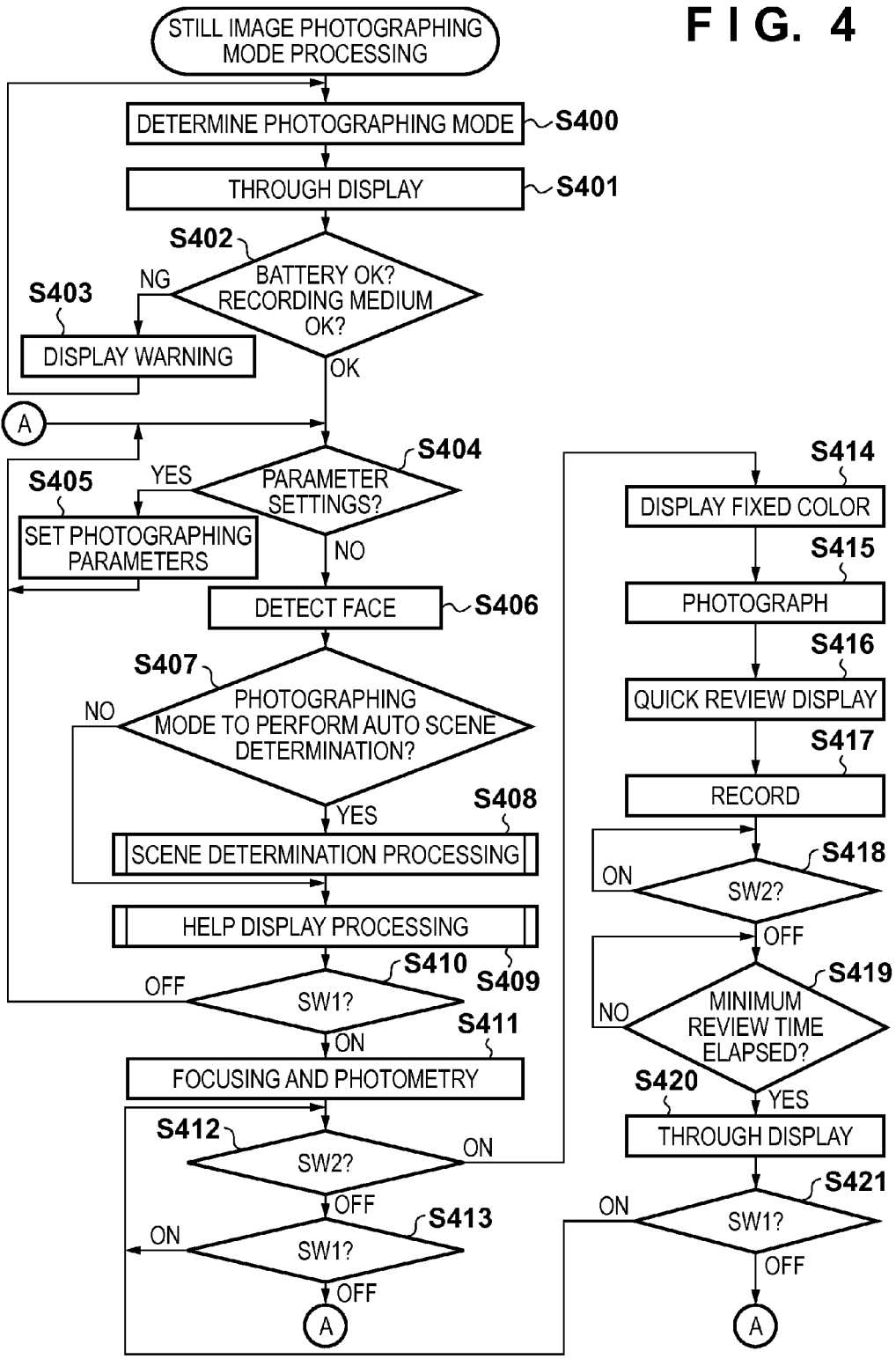
FIG. 4 is a flowchart of the still image photographing mode of the digital camera.

FIG. 4 is a flowchart of the still image photographing mode processing. FIG. 4 illustrates details of the processing from step S304 in FIG. 3 described above. Each process of this still image photographing mode processing is implemented by causing the system control unit 50 to expand a program stored in the memory 56 or the like on the system memory 52 and execute the program. Note that the still image photographing mode processing shown in FIG. 4 is ended by interrupt processing or the like when the operation mode is changed to another mode by the mode change switch 60, or the power switch 72 is set off.

When the still image photographing mode starts, the system control unit 50 determines the photographing mode in step S400. The photographing mode determination is done by obtaining, from the nonvolatile memory 56, the photographing mode at the end of the previous still image photographing mode and storing it in the system memory 52. The photographing mode here is the photographing mode to capture a still image. The digital camera 100 of this embodiment has, for example, the following photographing modes.

Auto mode: various parameters of the camera are automatically decided based on a measured exposure value by a program installed in the digital camera 100.

Auto scene mode: the camera analyzes pieces of information such as "person", "distance", "brightness", "color", and "motion" from a captured image or various sensor outputs, determines the photographic scene every time, and automatically does various photographing settings in accordance with the determined photographic scene.

Manual mode: the user can freely change various parameters of the camera.

Scene mode: the combination of the shutter speed, the f-number, the flash light emission amount, the sensitivity setting, and the like suitable for a photographic scene is automatically set.

Note that the scene mode further includes the following modes.

Portrait mode: a mode specialized to capture a person while blurring away the background to enhance the person.

Night view mode: a mode specialized to a night view, in which a person is irradiated with flash light, and the background is recorded at a low shutter speed.

Landscape mode: a mode specialized to a vast landscape scene.

Night & snap mode: a mode suitable for clearly capturing a night view and a person without using a tripod.

Kids & pets mode: a mode that enables to capture a child or pet incapable of holding still without missing the best moment for photographing.

Spring & autumn color mode: a mode suitable for capturing trees and leaves in fresh green of spring or the like.

Party mode: a mode to capture an object in faithful tint under a fluorescent lamp or an incandescent lamp while suppressing camera shake.

Snow mode: a mode to capture a person with a snowy background without making the person dark and leaving tinges of blue.

Beach mode: a mode that enables to capture a person or the like on the sea or a beach with strong sunlight reflection without making the person dark.

Fireworks mode: a mode to clearly capture skyrockets under optimum exposure.

Aquarium mode: a mode to set a sensitivity, white balance, and tint suitable for capturing fish and the like in an indoor aquarium.

Underwater mode: a mode to set a white balance suitable in water and perform photographing while suppressing tinges of blue.

Monochrome mode: a mode to select a toning such as black-and-white, sepia, blue, violet, or green and perform photographing.

Full color mode: a mode to capture an image in vivid colors and high saturation.

Through image mode: a mode that enables to select the brightness, tone, and saturation by plain words and compose an image.

When the photographing mode is determined, the system control unit 50 performs through display to display image data from the image sensing unit 22 on the display unit 28 in step S401. In the through display, an image that is being captured by the image sensing unit 22 is displayed on the display unit 28 as a moving image almost in real time without recording it in the recording medium 200. The operator can confirm the angle of view or estimate the timing of photographing while viewing the through display.

In step S402, the system control unit 50 judges the battery level of the power supply unit 30 formed from a battery or the like using the power supply control unit 80, the presence/absence of the recording medium 200, or whether the battery level poses a problem in the operation of the digital camera 100. Upon judging that a problem is present, the process advances to step S403, and the system control unit 50 makes a predetermined warning indication by an image or sound using the display unit 28, and returns the process to step S400. Upon judging that the state of the power supply unit 30 or the recording medium 200 is unproblematic, the process advances to step S404.

In step S404, the system control unit 50 judges whether a user operation of changing various photographing settings has been done on the operation unit 70. If a photographing setting change operation has been done, the process advances to step S405. Otherwise, the process advances to step S406.

Examples of the changeable photographing settings are the settings of electronic flash on/off, switching of continuous shooting/single shooting, self timer, image size (number of pixels), aspect ratio, and compression ratio. In the manual mode, the number of photographing settings the user can do is larger than in other photographing modes, and the f-number, the shutter speed, and the like can also be set. In step S405, the photographing parameters are set in accordance with the photographing setting change operation of the user (the settings are changed).

On the other hand, in step S406, the system control unit 50 performs face detection to detect whether a human face exists in the through-displayed image signal. Upon detecting a human face by the face detection processing, the system control unit 50 stores the position coordinates and the size (width and height) of each face detected in the image signal, the number of detected faces, the reliability coefficient, and the like in the system memory 52 as face information. If no face is detected by the face detection processing, the system control unit 50 sets 0 in the regions of the position coordinates, the size (width and height), the number of detected faces, the reliability coefficient, and the like in the system memory 52.

In step S407, the system control unit 50 judges whether the current photographing mode is a photographing mode to perform auto scene determination (automatically determine the photographic scene), that is, an auto scene mode. In this embodiment, assume that the auto scene mode is determined as true, and any other photographing mode is determined as false. However, even another photographing mode may be determined as true if it uses auto scene determination. If the mode is a photographing mode to perform auto scene determination, the process advances to step S408. Otherwise, the process advances to step S409.

In step S408, the system control unit 50 performs scene determination processing. Details of the scene determination processing will be described later with reference to FIG. 5. In step S409, the system control unit 50 performs help display processing. Details of the help display processing will be described later with reference to FIG. 6. In step S410, the system control unit 50 judges whether the first shutter switch signal SW1 is on (photographing preparation designation reception). If the first shutter switch signal SW1 is off, the process returns to step S404. On the other hand, if the first shutter switch signal SW1 is on, the process advances to step S411.

In step S411, the photographing preparation operation is performed. The system control unit 50 performs focus processing and sets the object in the focus of the photographing lens 103 (auto focus processing), and also performs photometric processing and decides the f-number and the shutter speed (exposure decision processing). Note that the electronic flash setting is also done in the photometric processing as needed. If a face has been detected in step S406, face AF can be performed to do photometry within the range of the detected face. In the auto scene mode, the photographing preparation operation is optimized in accordance with the current photographing mode determined by the scene determination processing in step S408.

In steps S412 and S413, the on/off states of the first shutter switch signal SW1 and the second shutter switch signal SW2 are judged. When the second shutter switch signal SW2 is turned on in the on state of the first shutter switch signal SW1, the process advances from step S412 to step S414. When the first shutter switch signal SW1 is turned off (when the second shutter switch signal SW2 remains off, and the first shutter switch signal SW1 is also turned off), the process returns from step S413 to step S404. During the time in which the first shutter switch signal SW1 is on, and the second shutter switch signal SW2 is off, the processes in steps S412 and S413 are repeated.

When the second shutter switch signal SW2 is turned on, the system control unit 50 changes the display state of the display unit 28 from through display to a fixed color display state (for example, display all in black) in step S414. In step S415, the system control unit 50 executes photographing processing including exposure processing and development processing. Note that in the exposure processing, the image data obtained via the image sensing unit 22 and the A/D converter 23 is written in the memory 32 via the image processing unit 24 and the memory control unit 15 or directly from the A/D converter 23 via the memory control unit 15 alone. In the development processing, the system control unit 50 reads out the image data written in the memory 32 and performs various kinds of processing using the memory control unit 15, and as needed, the image processing unit 24.

Next, in step S416, the system control unit 50 performs, on the display unit 28, quick review display of the image data obtained by the photographing processing. The quick review display is processing of displaying image data on the display unit 28 only during a predetermined time (review time) immediately after photographing the object to confirm the captured image. In step S417, the system control unit 50 executes recording processing of writing the image data obtained by the photographing processing in the recording medium 200 as an image file.

In step S418, the system control unit 50 judges the on/off state of the second shutter switch signal SW2. If the second shutter switch signal SW2 is on, the judgment in step S418 is repeated to wait until the second shutter switch signal SW2 is turned off. During this time, the above-described quick review display continues. That is, the above-described quick review display on the display unit 28 continues until the second shutter switch signal SW2 is turned off when the recording processing in step S417 has ended. With this arrangement, the user can carefully confirm the captured image data using the quick review display by continuing the full stroke state of the shutter button 61. Upon judging in step S418 that the second shutter switch signal SW2 is off, that is, when the user cancels the full stroke state by, for example, moving the hand off the shutter button 61, the process advances to step S419.

In step S419, the system control unit 50 judges whether the predetermined review time of the quick review display has elapsed. If the review time has not elapsed, the processing waits for the elapse of the review time. If the review time has elapsed, the process advances to step S420. In step S420, the system control unit 50 returns the display state of the display unit 28 for the quick review display to the through display state. With this processing, after the quick review display for confirming the captured image data, the display state of the display unit 28 automatically changes to the through display state to sequentially display image data from the image sensing unit 22 for next photographing.

In step S421, the system control unit 50 judges the on/off state of the first shutter switch signal SW1. If the first shutter switch signal SW1 is on, the process returns to step S412. If the first shutter switch signal SW1 is off, the process returns to step S404. That is, when the half stroke state of the shutter button 61 continues (the first shutter switch signal SW1 is on), the system control unit 50 prepares for the next photographing (step S412). On the other hand, if the shutter button 61 has been released (the first shutter switch signal SW1 is off), the system control unit 50 ends the series of photographing operations and returns to the photographing standby state (step S405).

[Scene Determination Processing]

Figure 5:
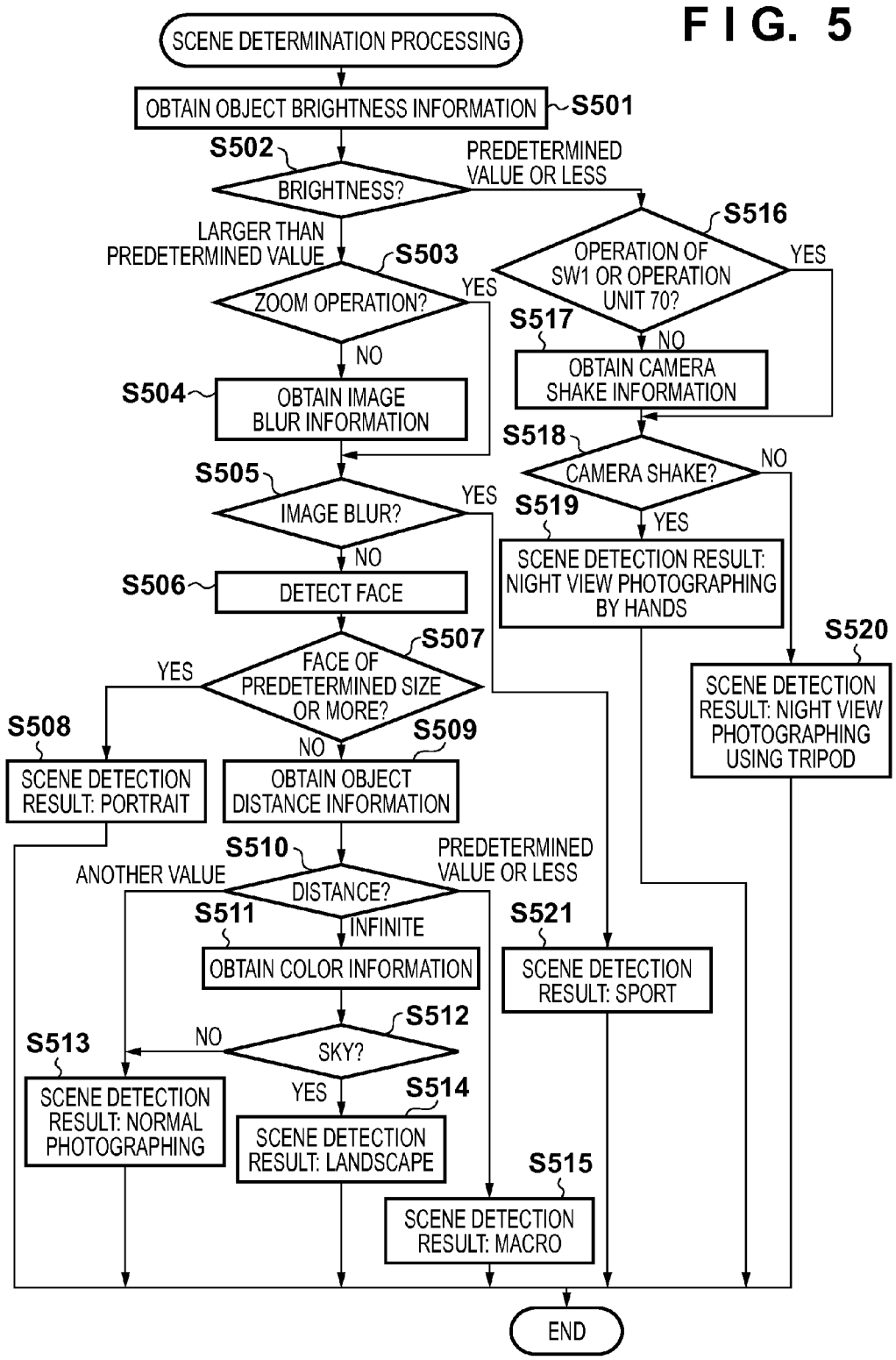
FIG. 5 is a flowchart of scene determination processing of the digital camera.

FIG. 5 is a flowchart illustrating scene determination processing, and shows details of the processing of step S408 in FIG. 4 described above. This processing is implemented by, for example, expanding a program recorded in the nonvolatile memory 56 on the system memory 52 and causing the system control unit 50 to execute the program. Note that FIG. 5 shows an example in which seven photographic scenes including normal photographing, landscape, macro, portrait, sport, night view photographing by hands, and night view photographing using a tripod are determined. However, the present invention is not limited to this.

When the scene determination processing starts, the system control unit 50 obtains the object brightness (the brightness value of the object) from the image captured by the image sensing unit 22 (step S501). That is, in the digital camera 100, the system control unit 50 performs brightness detection of detecting the brightness value of the object in step S501. Next, the system control unit 50 judges whether the obtained object brightness is equal to or less than a predetermined value set in a memory or the like in advance (step S502). As the object brightness, brightness information obtained in the past by photometric processing may be used.

If the object brightness is more than the predetermined value in step S502, the system control unit 50 judges whether the zoom button out of the operation unit 70 is being operated, that is, a designation to adjust the angle of view is being received from the user (step S503). Upon judging that the zoom button is not being operated, the system control unit 50 performs face detection/motion vector detection processing to obtain image blur information (a motion detection result representing the motion of the object) (step S504). On the other hand, upon judging that the zoom button is being operated, the system control unit 50 advances the process to step S505 without obtaining image blur information.

Note that the motion vector is detected from, for example, difference information obtained by comparing two time-sequential frame images. More specifically, the system control unit 50 performs matching between a block formed from a plurality of pixels and the peripheral blocks in the next frame image, and outputs the positional relationship to a matching block as a motion vector. Out of the motion vectors for a given time in one image, motion vectors having a relatively small motion and the same direction are determined as the background, and motion vectors having a large motion and different directions are determined as a moving object. The system control unit 50 subtracts a camera shake amount obtained by camera shake/anti-vibration control processing from the motion vector of the object, thereby obtaining the motion of the object as image blur information.

Note that in step S503, the system control unit judges whether the zoom button is being operated. However, it may be judged whether a predetermined time has not elapsed yet from the operation of the zoom button. As described above, the algorithm not to obtain the image blur information may continuously be used while the zoom button operation is being received or until the predetermined period elapses from the end of reception of the zoom button operation. Performing this processing allows the digital camera 100 to suppress the influence of a variation in the angle of view caused by the zoom button operation on the image blur information and avoid a scene detection error. Note that when the algorithm not to obtain the image blur information is used, scene determination after that is performed using image blur information obtained in the past, or the determination is done assuming that no image blur exists.

The system control unit 50 judges based on the obtained image blur information whether an image blur exists (step S505). If an image blur exists, the system control unit 50 determines the scene as "sport" (step S521), and ends the scene determination processing. If no image blur exists in step S505, the system control unit 50 performs face detection processing by face detection/motion vector detection processing (step S506).

Next, the system control unit 50 judges whether the size of the face detected in step S506 is equal to or larger than a predetermined value (step S507). If a face is detected, and its size is equal to or larger than the predetermined value, the system control unit 50 determines the scene as "portrait" (step S508), and ends the scene determination processing.

If no face having a size equal to or larger than the predetermined value is detected in step S507, the system control unit 50 performs photometric processing of obtaining object distance information representing the distance between the main object and the digital camera 100 (step S509). More specifically, in the photometric processing, the object distance information is obtained by the hill-climbing method (contrast method) using an image captured by the image sensing unit 22 or by a phase difference sensor. The system control unit 50 then judges the distance from the main object based on the obtained object distance information (step S510). Object distance information obtained by the past photometric processing may be used.

If the distance from the main object is equal to or smaller than a predetermined value in step S510, the system control unit 50 determines the scene as "macro" (step S515), and ends the scene determination processing. If the distance from the main object is infinite in step S510, the system control unit 50 obtains color information from the captured image (step S511) and judges based on the obtained color information whether the object includes the sky (step S512). Upon judging in step S512 that the object includes the sky, the system control unit 50 determines the scene as "landscape" (step S514), and ends the scene determination processing. On the other hand, if the object does not include the sky in step S512, the system control unit 50 determines the scene as "normal" (step S513), and ends the scene determination processing. If the distance from the main object is neither infinite nor equal to or smaller than the predetermined value and has another value in step S510, the system control unit 50 determines the scene as "normal" (step S513), and ends the scene determination processing.

Note that when the scene is determined as "sport", the system control unit 50 sets a shorter exposure time for image capture than in a case in which the scene is determined as "normal", thereby making the object image hard to blur. When the scene is determined as "portrait", the system control unit 50 sets a larger aperture diameter for image capture than in a case in which the scene is determined as "normal", and causes the image processing unit 24 to perform color processing of making the human flesh color closer to the ideal flesh color at the time of development. When the scene is determined as "macro", the system control unit 50 sets the aperture diameter smaller than a range settable in a case in which the scene is determined as "normal". When the scene is determined as "landscape", the system control unit 50 sets a smaller aperture diameter for image capture than in a case in which the scene is determined as "normal", and causes the image processing unit 24 to perform color processing of enhancing the saturation of the image data at the time of development. As described above, the system control unit 50 changes the control parameters in the exposure processing or development processing in accordance with the scene determination result.

If the object brightness is equal to or less than the predetermined value in step S502, the system control unit 50 judges whether the first shutter switch 62 or the operation unit 70 is being operated. That is, the system control unit 50 judges whether the first shutter switch 62 of the operation unit 70 is being operated, and the operation of the first shutter switch 62 or the operation unit 70 is being received (step S516). Note that in step S516, the system control unit 50 may judge whether a predetermined time has elapsed after reception of the operation of the first shutter switch 62 or the operation unit 70. The system control unit 50 may judge not only whether the first shutter switch 62 or the operation unit 70 is being operated but also whether the zoom button of the operation unit 70 is being operated.

If the first shutter switch 62 or the operation unit 70 is not being operated in step S516, the system control unit 50 obtains camera shake information from a camera shake detection unit (step S517). On the other hand, if the first shutter switch 62 or the operation unit 70 is being operated, the system control unit 50 advances to the next processing (step S518) without obtaining camera shake information. Performing this processing allows the digital camera 100 to suppress the influence of the operation of the first shutter switch 62 or the operation unit 70 on the camera shake information and avoid a scene detection error. Note that when an algorithm not to obtain the camera shake information is used, scene determination after that is performed using camera shake information obtained in the past, or the determination is done assuming that no camera shake exists.

Next, the system control unit 50 judges the presence/absence of a camera shake from the obtained camera shake information (step S518). Upon judging in step S518 that no camera shake exists, the system control unit 50 determines the scene as "night view photographing using a tripod" (step S520), and ends the scene determination processing. Upon judging in step S518 that a camera shake exists, the system control unit 50 determines the scene as "night view photographing by hands" (step S519), and ends the scene determination processing.

Note that when the scene is determined as "night view photographing using a tripod", the system control unit 50 sets the sensitivity of the image sensing unit 22 to the minimum value and performs long-time exposure. When the scene is determined as "night view photographing by hands", the system control unit 50 sets an upper limit for the exposure time and raises the sensitivity of the image sensing unit 22 by an amount of shortage for exposure.

As described above, the algorithm not to use the camera shake information is continuously used while the operation of the first shutter switch 62 or the operation unit 70 is being received or until a predetermined period elapses from the end of reception of the operation. As a result, the algorithm not to use the camera shake information is continuously used in a state in which the reliability of the camera shake information is low because of the operation of the first shutter switch 62 or the operation unit 70. This allows the digital camera 100 to avoid a scene detection error. Note that when not only the operation of the first shutter switch 62 or the operation unit 70 but also the zoom operation is performed, the scene determination processing may be performed using the algorithm not to use the camera shake information.

Scene determination processing according to this embodiment has been described above. The description has been made by exemplifying the operation of the first shutter switch 62 or the zoom operation as the condition not to obtain the camera shake information or image blur information. However, the operation of another operation member may be used as the condition, as a matter of course. In an arrangement including a user interface whose function is activated by applying a motion to the body of the digital camera 100 not only the operation of a member provided in the digital camera 100 but also a user operation of applying a motion to the body may be used as the condition not to obtain the information. That is, when the user has enabled the function of the above-described user interface by applying a motion to the digital camera 100, use of the camera shake information or image blur information may be prohibited at the time at which the motion has been detected.

[Help Display Processing]

Figure 6:
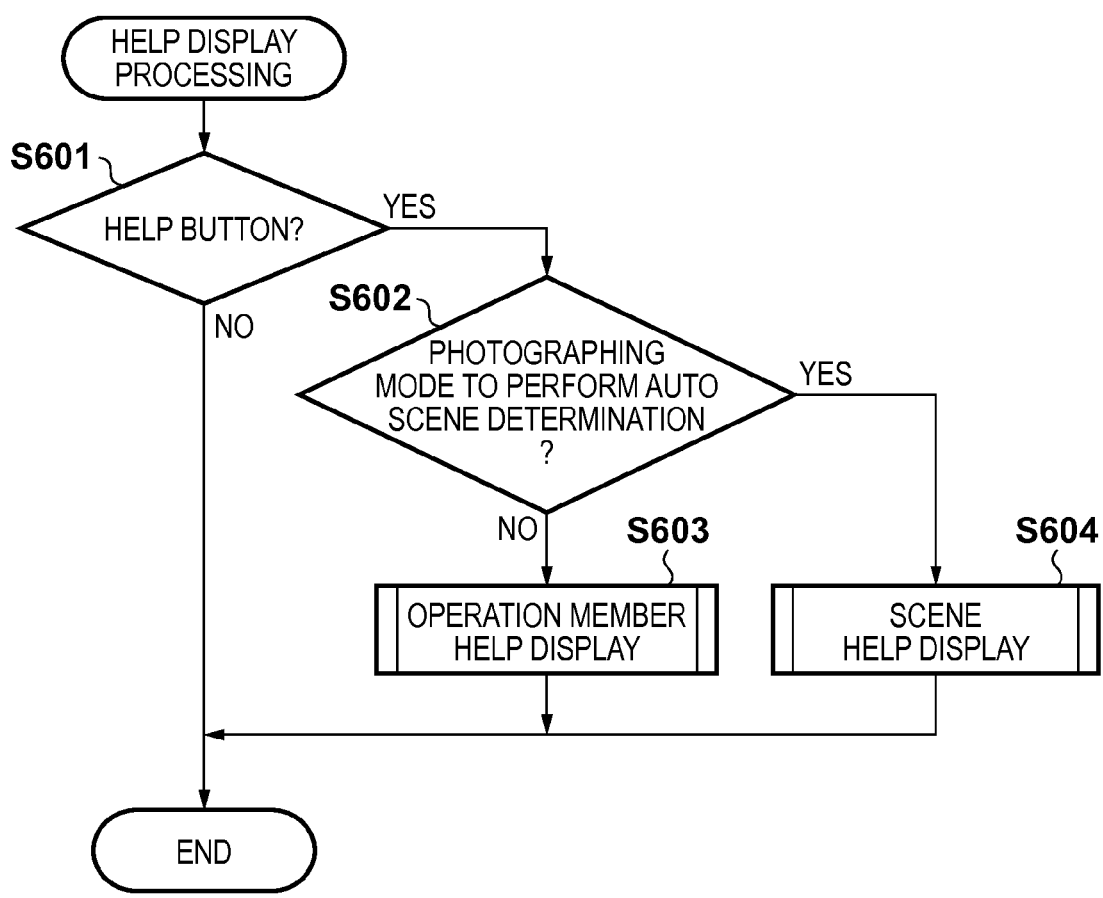
FIG. 6 is a flowchart of help processing based on the photographing mode of the digital camera.

FIG. 6 is a flowchart illustrating help display processing, and shows details of the processing of step S409 in FIG. 4 described above. This processing is implemented by expanding a program recorded in the nonvolatile memory 56 on the system memory 52 and causing the system control unit 50 to execute the program.

In step S601, the system control unit 50 judges whether the help button 73 is pressed. If the help button 73 is pressed, the process advances to step S602. Otherwise, the help display processing ends, the process advances to step S410 in FIG. 4.

In step S602, the system control unit 50 judges whether the current photographing mode is a photographing mode to perform auto scene determination (automatically determine the photographic scene). In this embodiment, assume that the auto scene mode is determined as true, and any other photographing mode is determined as false. However, even another photographing mode may be determined as true if it performs auto scene determination. If the mode is a photographing mode to perform auto scene determination, the process advances to step S604. Otherwise, the process advances to step S603.

In step S603, the system control unit 50 performs operation member help display processing to display a description associated with an operation member. The operation member help display processing is processing of giving a guidance about the function of each member of the operation unit 70 in the current operation mode. If the current operation mode is a photographing mode other than the auto scene mode, it can be assumed that the user is going to determine the current photographic scene by himself/herself and perform photographing under photographing settings decided by himself/herself. For this reason, a description of the function of the operation unit 70 necessary for the user to change the photographing settings by himself/herself is displayed to assist the user operation. Details of the operation member help display processing will be described later with reference to FIG. 7. When the process in step S603 has ended, the help display processing ends, and the process advances to step S410 in FIG. 4.

In step S604, the system control unit 50 performs scene help display. In the scene help display, a description associated with the photographic scene currently determined by auto scene determination is displayed. For example, what kind of photographic scene is being determined, what kind of photographing (photographing settings) is to be done based on the photographic scene under determination, and a note or advice for photographing the photographic scene under determination are displayed. If the current photographing mode is the auto scene mode or another photographing mode using auto scene determination, it can be assumed that the user is going to perform photographing while leaving current photographic scene determination and photographing settings to the camera instead of doing them by himself/herself. For this reason, a description of the function of the operation unit 70 necessary for the user to change the photographing settings by himself/herself is unnecessary at a high probability. If anything, recognizing what kind of photographing will be automatically performed by leaving everything to the camera reassures the user. It can also be assumed that the user who performs photographing while leaving everything to the camera is inexperienced in photographing at a high probability. Hence, an advice about, for example, how to hold the camera is displayed, thereby assisting the user so as to do appropriate photographing. Details of the scene help display will be described later with reference to FIG. 8. When the processing in step S604 has ended, the help display processing ends, and the process advances to step S410 in FIG. 4.

Note that in the processing shown in FIG. 6 described above, upon judging in step S601 that the help button 73 is pressed, a scene help is displayed independently of the previous display state of the display unit 28. That is, even when no through image is displayed on the display unit 28 or the display is off, an operation member help or scene help is displayed on the display unit 28 in accordance with the press of the help button 73. However, the present invention is not limited to this. Even upon judging in step S601 that the help button 73 is pressed, if no through image is displayed on the display unit 28 or the display is off, the help display processing may end without advancing to any one of steps S602 to S604. If no through image is displayed on the display unit 28 or the display is off, the user is assumed to be going to perform photographing while seeing through the viewfinder without focusing on the display unit 28. That is, when no through image is displayed on the display unit 28 or the display of the display unit 28 is off, the help display may be prohibited even when the help button 73 is pressed. Alternatively, if the help button 73 is pressed when no through image is displayed on the display unit 28 or the display is off, the display unit 28 may display a warning representing that no help is displayed because no through image is displayed, or a guidance representing that the help is displayed by changing the settings to display the through image

[Operation Member Help Display Processing]

The operation member help display processing in step S603 of FIG. 6 described above will be explained. FIGS. 11A to 11C show examples of screens displayed on the display unit 28 by the operation member help processing.

FIG. 11A shows an example of the screen of initial display in the operation member help display. In the initial display of the operation member help display, an operation member indication 1101, a description item list 1102, a selected operation member mark 1103, and an item selection frame 1104 are displayed on the display unit 28. The operation member indication 1101 illustrates a portion where the members of the operation unit 70 concentrate out of the outer appearance of the digital camera 100. The description item list 1102 indicates a list of description items of operation members. The selected operation member mark 1103 indicates an operation member corresponding to the item currently selected in the description item list 1102. The item selection frame 1104 indicates the item currently selected in the description item list 1102.

FIG. 11B shows an example of the operation member help display screen when an item different from that in FIG. 11A is selected in the description item list 1102. The selected item in the description item list 1102 can be changed by operating up and down buttons included in the operation unit 70. When the selected item is changed, the item selection frame 1104 is displayed on the changed selected item. The selected operation member mark 1103 is displayed on the operation member corresponding to the changed selected item out of the operation member indication 1101.

FIG. 11C shows an example in which a detailed description of the function indicated by the item selected in the description item list 1102 is displayed. When the user presses a right button included in the operation unit 70 from the state in which the description item list 1102 is displayed, a more detailed description can be displayed for the function indicated by the item selected in the description item list 1102. At this time, the operation member indication 1101 and the selected operation member mark 1103 remain displayed so that the user can know which is the operation member to be operated to activate the function the displayed detailed description concerns. For example, when the right button is pressed in the state shown in FIG. 11B, the display changes to that in FIG. 11C. When the left button included in the operation unit 70 or the help button 73 is pressed in the state shown in FIG. 11C, the display can return to the initial display state shown in FIG. 11B.

Performing the above-described display shown in FIGS. 11A to 11C allows the user to recognize what kind of photographing settings can be done by operating which operation member. Details of operation member help display processing of doing display as shown in FIGS. 11A to 11C will be explained next.

Figure 7:
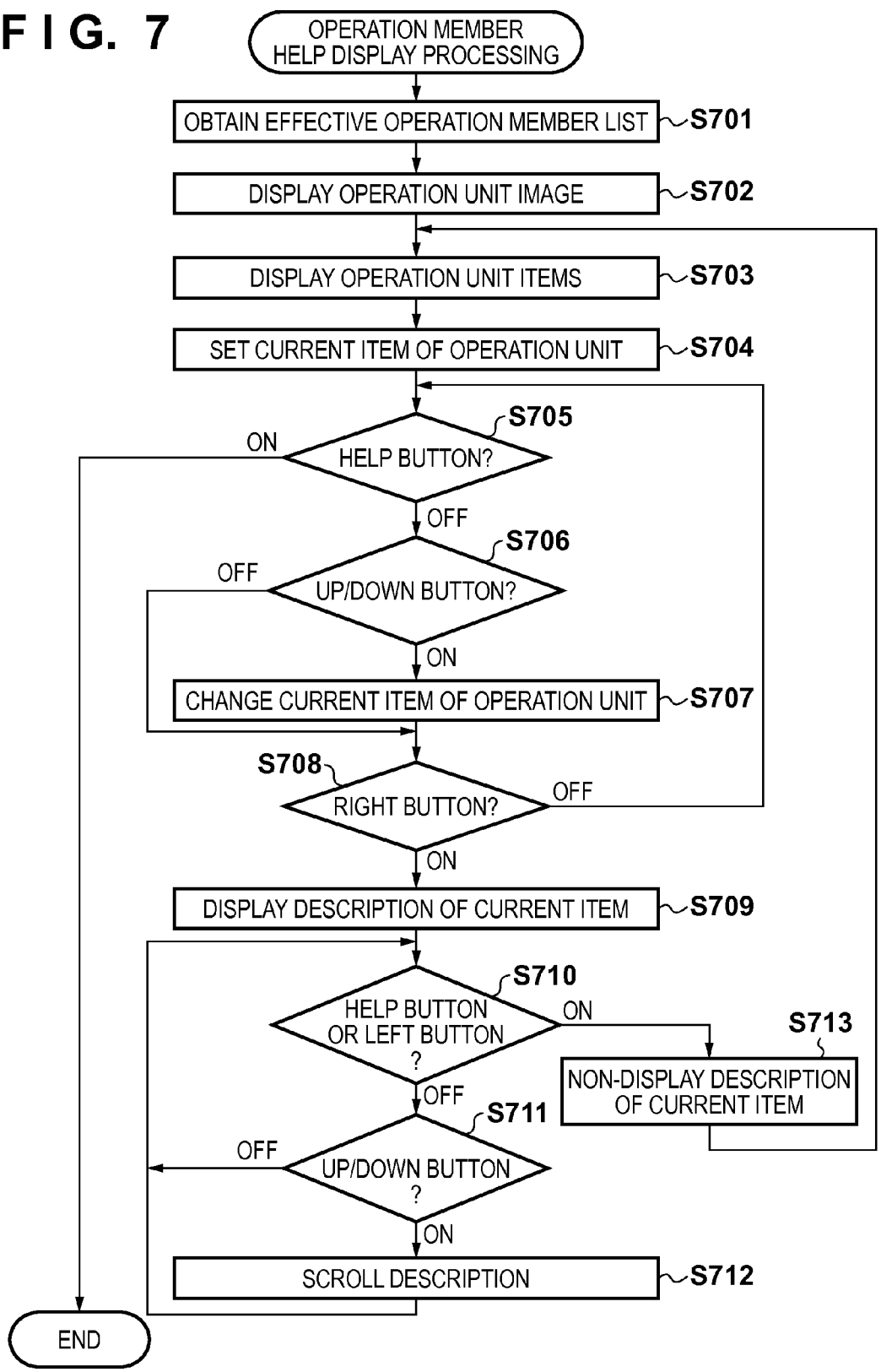
FIG. 7 is a flowchart of operation member help display of the digital camera.

FIG. 7 is a flowchart illustrating operation member help display processing, and shows details of the processing of step S603 in FIG. 6 described above. This processing is implemented by, for example, expanding a program recorded in the nonvolatile memory 56 on the system memory 52 and causing the system control unit 50 to execute the program.

In step S701, the system control unit 50 obtains, from the nonvolatile memory 56, a list of effective operation members in the current photographing mode out of the operation unit 70. In step S702, the system control unit 50 displays, on part of the display unit 28, image data that illustrates the portion where the members of the operation unit 70 concentrate out of the outer appearance of the digital camera 100, like the operation member indication 1101 shown in FIG. 11A.

In step S703, the system control unit 50 displays the description item list 1102 on the display unit 28 based on the list obtained in step S701. In step S704, the system control unit 50 displays the item selection frame 1104 on the item (current item) selected in the above-described description item list 1102. In addition, the system control unit 50 displays the selected operation member mark 1103 on the selected operation member corresponding to the selected item out of the operation member indication 1101. A display example of this result is shown in FIG. 11A described above.

In step S705, the system control unit 50 judges whether the help button 73 is pressed. If the help button 73 is pressed, the help display processing ends. If the help button 73 is not pressed, the process advances to step S706. In step S706, the system control unit 50 judges whether the up button or down button (to be referred to as the up/down button hereinafter) included in the operation unit 70 is pressed. If the up/down button is pressed, the process advances to step S707. Otherwise, the process advances to step S708.

In step S707, the system control unit 50 changes the selected item (current item) out of the description item list 1102 in accordance with the operation of the above-described up/down button, and moves the item selection frame 1104 to the current item. For example, when the up button is pressed, an item immediately above the currently selected item is selected in the above-described description item list 1102. When the down button is pressed, an item immediately below the currently selected item is selected in the above-described description item list 1102. If the item immediately above or below the currently selected item does not exist, the item selection frame may remain on the current item, or the first item on the opposite side may be selected. In addition, the system control unit 50 changes the display position of the selected operation member mark 1103 in accordance with the change in the selected item, and displays the selected operation member mark 1103 on the operation member corresponding to the selected item out of the operation member indication 1101. A display example when the down button is pressed five times in the state shown in FIG. 11A is shown in FIG. 11B described above.

In step S708, the system control unit 50 judges whether the right button included in the operation unit 70 is pressed. If the right button is pressed, the process advances to step S709. If the right button is not pressed, the process returns to step S705. In step S709, the system control unit 50 displays a detailed description screen for the function indicated by the item selected in the description item list 1102. For example, when the right button is pressed in the display shown in FIG. 11B, the system control unit 50 displays the screen shown in FIG. 11C described above on the display unit 28. This allows the user to see a description concerning the operation member intentionally selected by him/her.

In step S710, the system control unit 50 judges whether the left button included in the operation unit 70 or the help button 73 is pressed. If the button is pressed, the process advances to step S713. Otherwise, the process advances to step S711. In step S711, the system control unit 50 judges whether the up/down button is pressed. If the button is pressed, the process advances to step S712. Otherwise, the process returns to step S710.

In step S712, the system control unit 50 performs scroll processing of the displayed description. However, if the description fits in the screen, the scroll processing need not be performed. In step S713, the system control unit 50 sets the description of the item as shown in FIG. 11C in a non-display state, and returns the process to step S703. With this processing, the description indication state ends, and the display returns to the state shown in FIG. 11B.

The operation member help display processing of causing the user to select an operation member he/she wants to know in detail and displaying a description thereof is thus performed.

[Scene Help Display]

Figure 8:
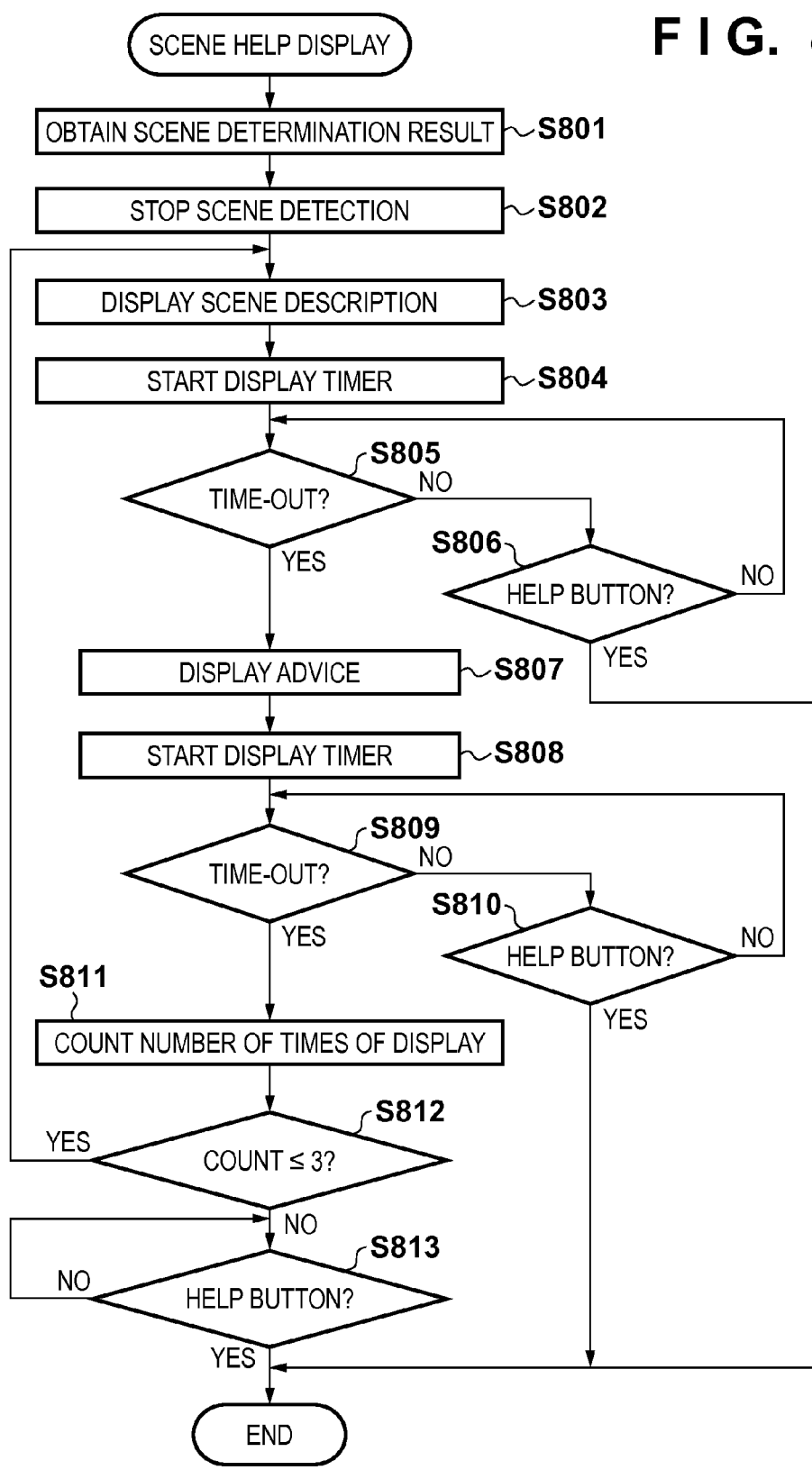
FIG. 8 is a flowchart of scene help display of the digital camera.

FIG. 8 is a flowchart illustrating scene help display processing, and shows details of the processing of step S604 in FIG. 6 described above. This scene help display processing is implemented by, for example, causing the system control unit 50 to expand a program recorded in the nonvolatile memory 56 or the like on the system memory 52, execute the program, and control display of the display unit 28 or the like.

In step S801, the system control unit 50 obtains the result of scene determination described with reference to FIG. 5 from the nonvolatile memory 56. In step S802, the system control unit 50 stops the scene determination processing. The scene determination processing is stopped to increase the readability of the description of a scene or an advice at the time of scene help display. When reading the description of a scene, the user reads the description while directing the camera to the ground in many cases, instead of continuously directing it to the object. If scene determination is done without directing the camera to the object, a photographic scene different from that to be photographed by the user is determined. For this reason, displaying a help for a result obtained by performing scene determination without directing the camera to the object is meaningless. In addition, if the scene determination is not stopped, the situation of the object may change during reading of the description, and the scene determination result may change accordingly. Hence, the description the user is reading may change to the description of another scene, resulting in difficulty in reading the description. In this embodiment, to solve this problem, scene determination is stopped during scene help display. Note that even if the scene determination result changes during scene help display, the contents of the scene help are prohibited from changing. Hence, this can also be implemented by prohibiting storage of the changed scene contents in the nonvolatile memory 56 without stopping the scene determination or by storing the contents in the nonvolatile memory 56 and prohibiting setting read at the time of scene help display.

In step S803, the system control unit 50 obtains a scene description indication corresponding to the detected scene from the nonvolatile memory 56 and displays it on the display unit 28. For example, a description of the contents of photographing settings that are automatically done in accordance with the scene determination result is displayed. In this embodiment, an example of the correspondence table between a detected scene and a description is shown in FIG. 13. The nonvolatile memory 56 holds a table as shown in FIG. 13, and the system control unit 50 obtains a text to be displayed on the help screen from this table. Examples of the display screen will be explained below with reference to FIGS. 12A to 12I.

Figure 12A:
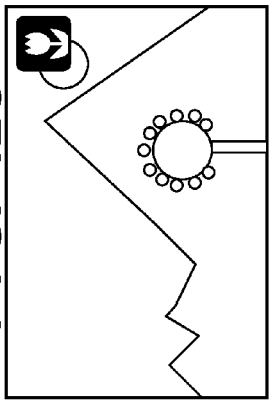
FIGS. 12A to 12I are views showing examples of a screen in operation member help display of the digital camera.
Figure 12B:
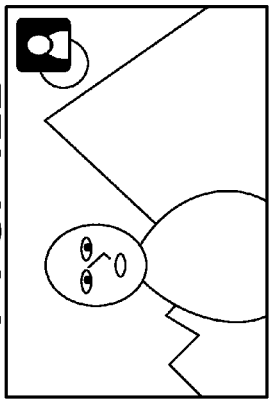
Figure 12C:
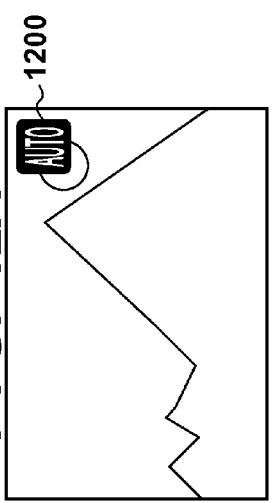

FIGS. 12A to 12C show examples of the photographing standby screen displayed on the display unit 28 before display of a scene help in the scene determination mode. The through image and a scene icon 1200 representing the scene determined at that point of time are displayed. FIG. 12A shows an example of the standby screen when the scene determination result is "normal". The scene icon 1200 representing the normal state is superimposed on the through image and displayed on the display unit 28. FIG. 12B shows an example of the photographing standby screen when the scene determination result is "person". FIG. 12C shows an example of the photographing standby screen when the scene determination result is "macro".

Figure 12D:
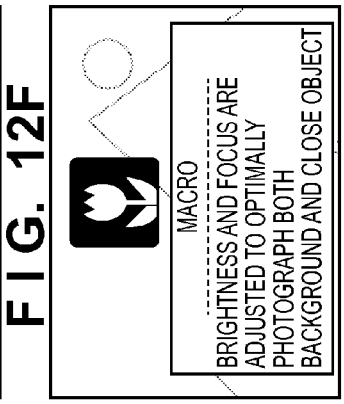
Figure 12E:
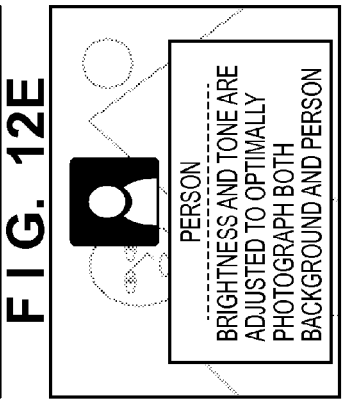
Figure 12F:
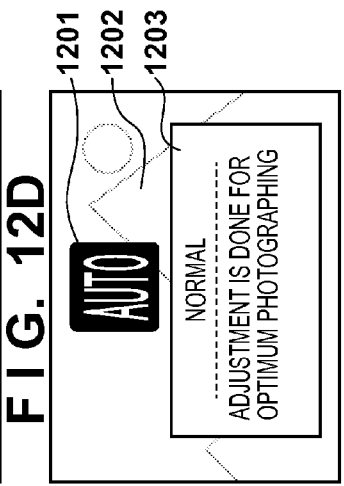

FIGS. 12D to 12F show display examples when the help button 73 is pressed in the states shown in FIGS. 12A to 12C, respectively. FIGS. 12D to 12F show examples of the display screen displayed by the processing in step S903. FIG. 12D shows a display example in the normal state, FIG. 12E shows a display example for scene: person, and FIG. 12F shows a display example for scene: macro.

The arrangement of the screen will be explained with reference to FIG. 12D. A scene icon 1201 larger than the scene icon 1200 displayed before the scene help display is displayed. A through image 1202 is displayed semitransparently. A description indication 1203 that describes the name and outline of the scene (the scene represented by the scene icon 1201) determined immediately before the scene help display is displayed. Semitransparently displaying the through image 1202 allows to increase the visual perceptivity of the scene icon 1201 and the description indication 1203. The through image 1202 allows the user to judge whether the scene represented by the scene icon 1201 and determined immediately before the scene help display matches the current situation under photographing. Hence, the user can know what kind of auto scene determination result is obtained by photographing what kind of scene. The user can also judge whether the contents of the scene help currently displayed are continuously suitable for the current photographing situation. It is therefore possible to improve the visual perceptivity of the help and also confirm the current scene.

In step S804, the system control unit 50 starts the display timer to control the display time of the scene description indication. In step S805, the system control unit 50 judges whether the timer has counted a designated time. The scene description indication is continued until the time-out of the timer. However, if a user operation indicating the intention to end the scene help display (in this embodiment, an operation of pressing the help button 73) is detected during waiting for the time-out of the timer, the scene help display processing ends (step S806).

Figure 12G:
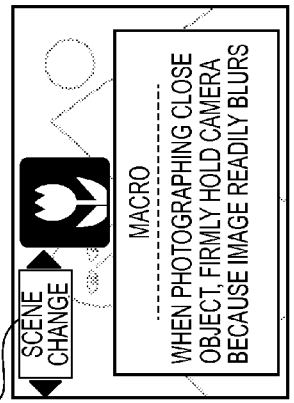
Figure 12H:
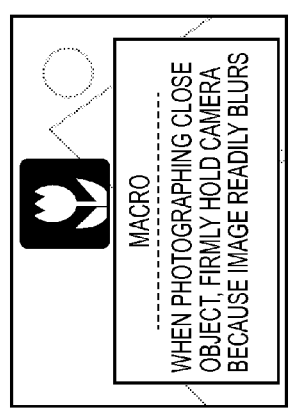

In step S807, the system control unit 50 obtains an advice indication corresponding to the detected scene from the nonvolatile memory 56 and displays it on the display unit 28. An example of the correspondence between a detected scene and an advice text is shown in the table of FIG. 13. FIGS. 12G and 12H show display examples of the screen in step S807. FIG. 12G shows a display example for scene: person, and FIG. 12H shows a display example for scene: macro.

The layout of the display is the same as in the scene description indication except that only an advise indication portion 1204 is different. For a scene that does not need any advice, like "scene: normal", the advise indication can be omitted. In this case, for example, only the scene description is displayed without switching between the scene description and the advice.

In step S808, the system control unit 50 starts the display timer to control the display time of the advise indication. In step S809, the system control unit 50 judges whether the timer has counted a designated time. The advice indication is continued until the time-out of the timer. However, if a user operation indicating the intention to end the scene help display (in this embodiment, an operation of pressing the help button 73) is detected during waiting for the time-out of the timer, the scene help display processing ends (step S810).

In step S811, the system control unit 50 counts the number of times of description and advice display and stores the count value in the nonvolatile memory 56. In step S812, the system control unit 50 judges whether the count value representing the number of times of display is 3 or less. If the count value is 3 or less, the process returns to step S803 to repeat the above-described scene description indication and advice indication. On the other hand, if the count value exceeds 3, the advice indication is continuously displayed until a user operation indicating the intention to end the scene help display is detected (in this embodiment, until an operation of pressing the help button 73 is detected) (step S813). By the processes in steps S803 to S812, the description and advice are automatically alternately displayed. Hence, the user can confirm the description and advice corresponding to the scene determination.

As described above, according to the first embodiment, when the operation of calling a help is performed, the user can see a description of a more suitable matter based on whether scene determination is being performed. Additionally, in the scene help display, once the description of a photographic scene is displayed, the photographic scene as the help display target is fixed independently of the photographic scene determination result after that. That is, in the scene help display, help display concerning the photographic scene immediately before the screen is displayed is fixed. For this reason, the user can properly read the description that is being displayed even if the scene changes during the description indication.

Second Embodiment

Scene Help Display

Figure 9:
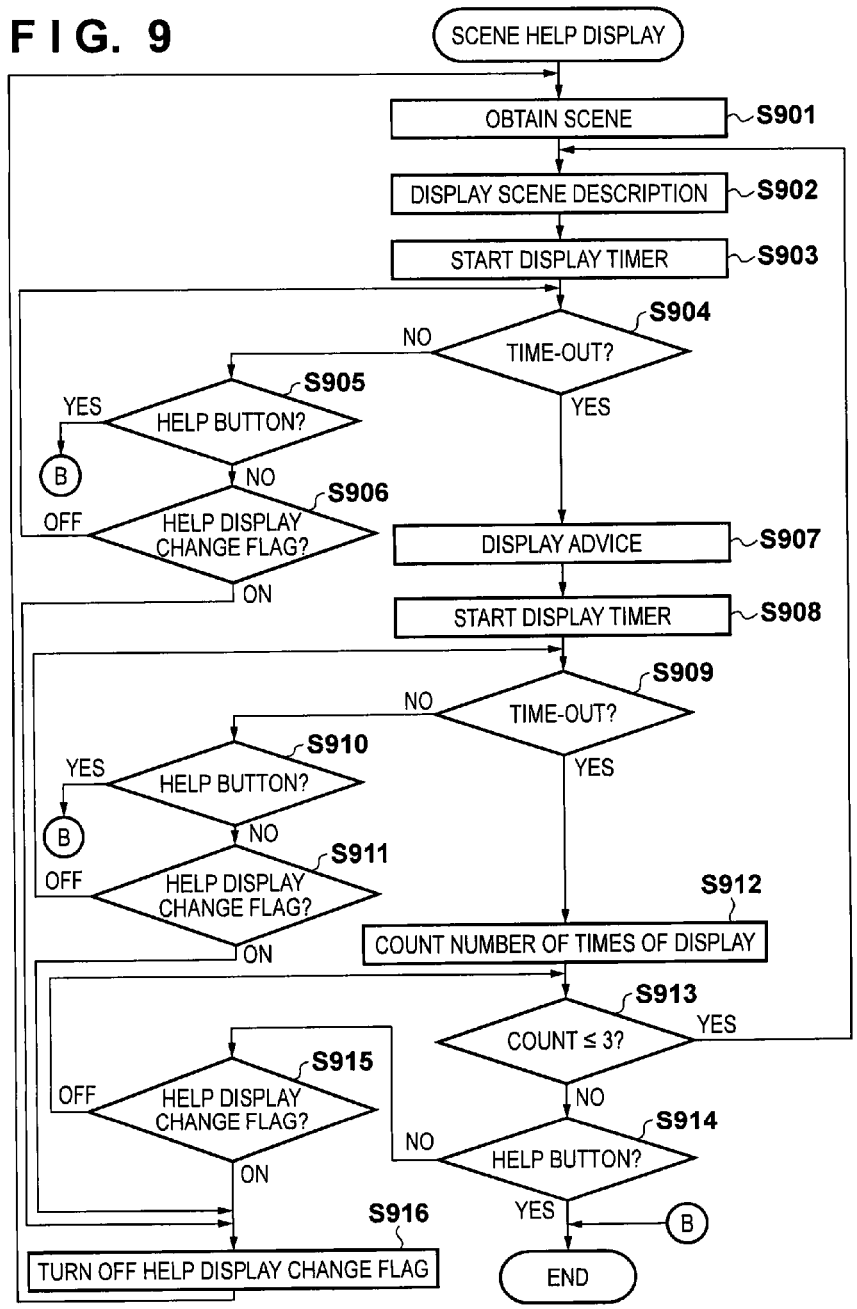
FIG. 9 is a flowchart of scene help display of the digital camera.

FIG. 9 is a flowchart illustrating scene help display processing according to the second embodiment, and shows details of the processing of step S604 in FIG. 6 described above. Each process of this scene help display is implemented by, for example, causing a system control unit 50 to expand a program recorded in a nonvolatile memory 56 or the like on a system memory 52 and execute the program.

In step S901, the system control unit 50 obtains the result of scene determination processing described with reference to FIG. 5 from the nonvolatile memory 56. In step S902, the system control unit 50 obtains a scene description indication corresponding to the detected scene from the nonvolatile memory 56 and displays it on a display unit 28. The scene description indication is the same as in the first embodiment.

In step S903, the system control unit 50 starts the display timer to control the display time of the scene description indication. In step S904, the system control unit 50 judges whether the timer has timed out. The scene description indication is continued until the time-out of the display timer. However, if a user operation indicating the intention to end the scene help display (in this embodiment, an operation of pressing a help button 73) is detected during waiting for the time-out of the display timer, the scene help display processing ends (step S905). In addition, if on of a help display change flag is detected during waiting for the time-out of the display timer, the system control unit 50 advances the process to step S916 to change the display to a help display corresponding to the scene that has changed. The help display change flag indicates that the user has an intention to change the help display based on a change in the scene determination result, and is set by processing to be described later with reference to FIG. 10. In step S916, the system control unit 50 turns off the help display change flag and returns the process to step S901 to execute help display corresponding to a new scene.

When the display timer has timed out, the process advances from step S904 to step S907. In step S907, the system control unit 50 obtains an advice indication corresponding to the detected scene from the nonvolatile memory 56 and displays it on the display unit 28. The advice indication is the same as in the first embodiment.

In step S908, the system control unit 50 starts the display timer to control the display time of the advise indication. In step S909, the system control unit 50 judges whether the display timer has counted a designated time. The advice indication is continued until the time-out of the display timer. However, if a user operation indicating the intention to end the scene help display (in this embodiment, an operation of pressing the help button 73) is detected during waiting for the time-out of the display timer, the scene help display processing ends (step S910). In addition, if on of the help display change flag (to be described later with reference to FIG. 10) is detected during waiting for the time-out of the display timer, the system control unit 50 advances the process to step S916 to change the display to a help display corresponding to the scene that has changed. This processing is the same as that during waiting for the time-out of the display timer in step S904.

When the display timer has timed out, the process advances from step S909 to step S912. In step S912, the system control unit 50 counts the number of times of description and advice display and stores the count value in the nonvolatile memory 56. In step S913, the system control unit 50 judges whether the count value representing the number of times of display is 3 or less. If the count value is 3 or less, the process returns to step S902 to repeat the above-described scene description indication and advice indication. On the other hand, if the count value exceeds 3, the advice indication is continuously displayed
until a user operation indicating the intention to end the scene help display is detected (in this embodiment, until an operation of pressing the help button 73 is detected) or
until a user's intention to change the help display based on a change in the scene determination result is detected (until on of the help display change flag is detected) (steps S914 and S915).

[Scene Change Confirmation Processing]

Figure 10:
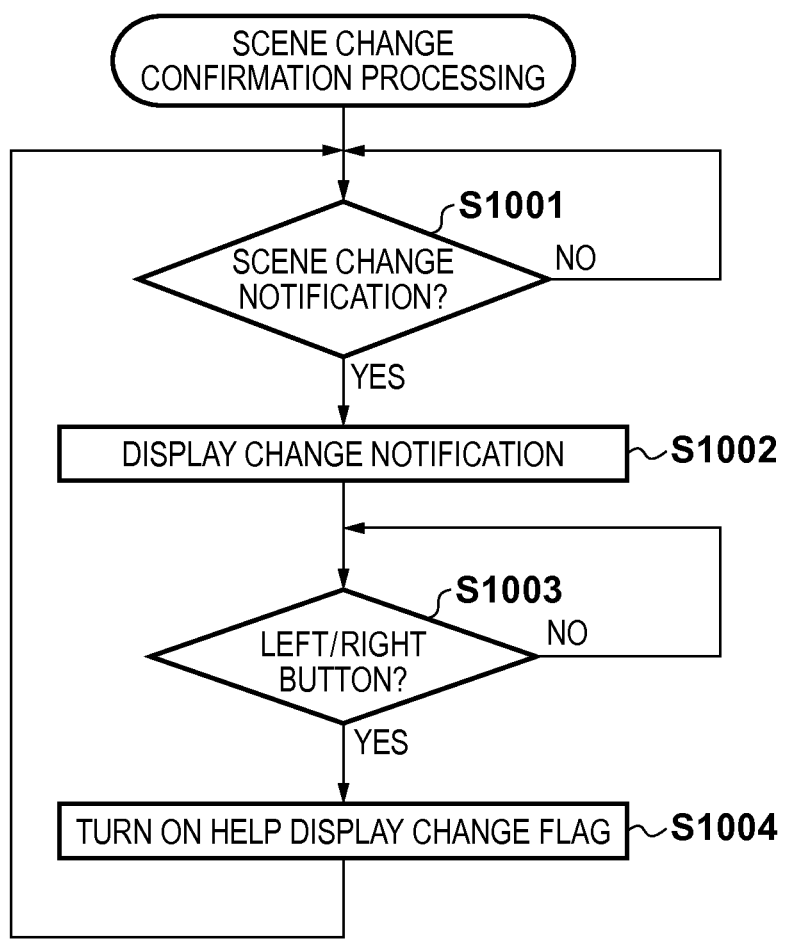
FIG. 10 is a flowchart of scene change confirmation processing of the digital camera.

FIG. 10 is a flowchart illustrating scene change confirmation processing. Each process of this scene change confirmation processing is implemented by, for example, causing the system control unit 50 to expand a program recorded in the nonvolatile memory 56 or the like on the system memory 52 and execute the program. The processes shown in FIGS. 9 and 10 are assumed to be executed parallelly by, for example, multitask processing. More specifically, while the scene help display processing shown in FIG. 9 is being executed, the scene change confirmation processing shown in FIG. 10 is parallelly executed.

In step S1001, the system control unit 50 obtains the result of scene determination processing described with reference to FIG. 5 from the nonvolatile memory 56, and judges whether the scene has changed by comparing the scene determination result with the contents of previous scene determination. As long as the scene remains unchanged, the processing in step S1001 is repeated. If the scene has changed, the process advances to step S1002.

Figure 12I:
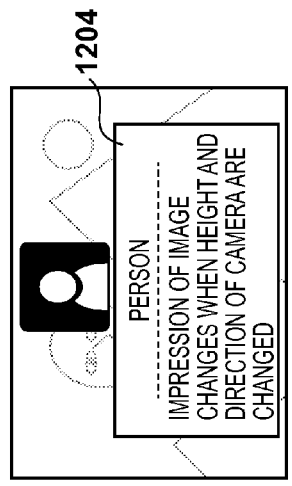

In step S1002, the system control unit 50 displays an indication representing the change on the display unit 28 that is displaying a scene description or advice. A display example is shown in FIG. 12I. FIG. 12I shows a display example when the scene determination result has changed in the display state shown in FIG. 12H. A scene change indication 1205 is displayed, thereby notifying the user of the scene change. In addition, a left/right arrow icon is displayed to indicate that the scene as the target of the scene description or advice can be changed by operating the left and right buttons.

In step S1003, the system control unit 50 judges whether the user has operated one of the left and right buttons of an operation unit 70. Upon judging that the user has not performed the button operation, the system control unit 50 continuously monitors the user operation. Upon judging that the left or right button has been operated, the process advances to step S1004.

In step S1004, the system control unit 50 changes the help display change flag to on and returns the process to step S1001. This allows to always notify the user to a scene change. In addition, since the user operation on the left or right button or the like serves as a trigger to turn on the help display change flag, the description and advice of the changed scene can be confirmed by the above-described processes in steps S906, S911, and S915.

As described above, according to the second embodiment, when the operation of calling a help is performed, the user can see a description of a more suitable matter based on whether scene determination is being performed, as in the first embodiment. Additionally, the scene help display is fixed to the description of the scene immediately before the screen is displayed. For this reason, the user can properly read the description that is being displayed even if the scene changes during the description indication. In the second embodiment, scene determination is done even during the scene help display. When the scene has changed, the user is asked whether to change the scene help display (the scene change indication 1205 in FIG. 12I). If the user has input a designation to change the scene help display, the scene help display is updated based on the latest scene determination result. Hence, according to the second embodiment, since the help display is not automatically changed, the user can properly read the description of the help and also read the latest scene determination result.

Note that in the above-described embodiments, the history of scene changes determined by the scene determination may be stored, one scene may be selected from the stored scene history by operating the left and right keys, and a description and advice may be displayed for the selected scene. In the above-described embodiments, the display of the description associated with the operation unit and the description associated with the scene determination result are automatically switched depending on the operation mode (whether to use the scene determination) at the time of the operation of the help button 73. However, the present invention is not limited to this. For example, a dedicated operation means for displaying the description concerning the scene determination result may be provided.

Note that the control by the above-described system control unit 50 can be either performed by one piece of hardware or divisionally performed by a plurality of pieces of hardware to control the entire apparatus.

The present invention has been described in detail based on the preferred embodiments. However, the present invention is not limited to these specific embodiments, and various forms are also incorporated in the present invention without departing from the scope and spirit of the present invention. The above-described embodiments merely indicate an example of the present invention, and the embodiments can also be combined appropriately.

In the above embodiments, an example has been described in which the present invention is applied to a digital camera. However, the present invention is not limited to this example and is also applicable to any electronic apparatus having an image capture means. More specifically, the present invention is applicable to a digital video camera, a digital camera, or a personal computer, a PDA, a cellular phone terminal, a music player, a game machine or the like equipped with a digital video camera.

As described above, according to the above-described embodiments, it is possible to appropriately display a help in accordance with a scene determination result.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-014578 filed Jan. 26, 2012, Japanese Patent Application No. 2012-014579 filed Jan. 26, 2012, and Japanese Patent Application No. 2012-018822 filed Jan. 31, 2012, which are hereby incorporated by reference herein in their entirety.

What is claimed is:

1. An electronic apparatus comprising:
   a determination unit configured to determine one of a plurality of photographic scenes based on an image being captured by an image capture unit;
   a reception unit configured to receive a help designation to display a help screen;
   a setting unit configured to automatically perform a photographing setting based on the one of the plurality of photographic scenes determined by the determination unit; and
   a display control unit configured to control to display, on a display unit, a display item that represents the one of the plurality of photographic scenes determined by the determination unit together with a through image being captured by the image capture unit, and configured to control, in accordance with reception of the help designation by the reception unit during display of the through image and the display item, to display information, which is more detailed than the display item, as a description concerning the one of the plurality of photographic scenes determined by the determination unit as the help screen.

2. The apparatus according to claim 1, wherein the display control unit displays a description of contents of the photographing settings performed by the setting unit as the description concerning the one of the plurality of photographic scenes determined by the determination unit on the help screen.

3. The apparatus according to claim 2, wherein when a predetermined time has elapsed after display of the description of the contents of the photographing settings performed by the setting unit on the help screen, the display control unit displays advice about how to hold a camera in accordance with the determined photographic scene.

4. The apparatus according to claim 1, further comprising:
   an operation member configured to receive a designation of a user; and
   a photographing mode setter configured to set a photographing mode to one of a plurality of photographing modes including a first photographing mode and a second photographing mode,
   wherein the first photographing mode is a mode in which the setting unit automatically performs photographing setting based on the one of the plurality of photographic scenes determined by the determination unit, and the second photographing mode is a mode in which the photographing setting is performed in accordance with a user's operation,
   wherein, in a case where the first photographing mode is set, the display control unit displays the description concerning the photographic scene determined by the determination unit as the help screen in response to reception of the help designation by the reception unit, and
   wherein, in a case where the second photographing mode is set, the display control unit displays, in response to reception of the help designation by the reception unit, an arrangement of each operation member and a function assigned to each operation member for the second photographing mode as the help screen.

5. The apparatus according to claim 1, wherein on display unit, the display item is a scene icon representing the photographic scene determined by the determination unit.

6. The apparatus according to claim 1, wherein after the description concerning the photographic scene determined has been displayed on the help screen, the display control unit fixes the photographic scene as a target of the description on the help screen independently of the determination of the photographic scene by the determination unit.

7. The apparatus according to claim 1, further comprising a stop unit for stopping the determination by the determination unit during a time in which the display control unit is displaying the description concerning the photographic scene determined by the determination unit as the help screen.

8. The apparatus according to claim 1, wherein when the description concerning the determined photographic scene is being displayed on the help screen, the display control unit displays the through image being captured by the image capture unit such that the through image is visually perceivable.

9. The apparatus according to claim 8, wherein when displaying the description concerning the determined photographic scene, the display control unit sets the through image captured by the image capture unit in a semitransparent state and displays the through image and the help screen in a superimposed manner.

10. The apparatus according to claim 1, wherein the description concerning the determined photographic scene on the help screen includes advice about how to hold a camera.

11. The apparatus according to claim 1, wherein if the user has designated to update the help screen during display of the description concerning the determined photographic scene on the help screen, the display control unit switches the help screen to display a description concerning a photographic scene represented by a latest determination result by the determination unit.

12. The apparatus according to claim 11, further comprising a notification unit configured to notify the user of a change in the determination result by the determination unit during display of the description concerning the determined photographic scene.

13. The apparatus according to claim 1, wherein the reception unit receives the help designation only during a time in which the through image being captured by the image capture unit is displayed.

14. The apparatus according to claim 13, further comprising a warning unit configured to, when the help designation is generated during a time in which the through image is not displayed, display one of a warning representing that the through image is not displayed and advice that prompts a start of displaying the through image.

15. The apparatus according to claim 1, wherein the electronic apparatus comprises an image capture apparatus including the image capture unit.

16. An electronic apparatus control method comprising:
    determining, one of a plurality of photographic scenes based on an image being captured by an image capture unit;
    receiving a help designation to display a help screen;
    automatically performing photographing setting based on the determined one of the plurality of photographic scenes determined by a determination unit; and
    controlling to display, on a display unit, a display item that represents the one of the plurality of photographic scenes determined by the determination unit together with a through image being captured by the image capture unit, and controlling, in accordance with reception of the help designation in the reception step, to display information, which is more detailed than the display item, as a description concerning the one of the plurality of photographic scenes determined in the determining as the help screen.

17. A non-transitory computer-readable storage medium storing a program that causes a computer to execute an electronic apparatus control method according to claim 16.

* * * * *